Inventor
T. SEKIMOTO
By Wallis J. Baum
Attorney

Inventor
T. SEKIMOTO
By Walter J. Baum
Attorney

Inventor
T. SEKIMOTO
By [signature]
Attorney

United States Patent Office 3,428,899

Patented Feb. 18, 1969

3,428,899

SELECTIVE COMMUNICATION SYSTEM WHEREIN EACH INFORMATION PULSE IS ADDRESS CODED FOR TRANSMISSION ON A SELECTED IDLE CARRIER FREQUENCY

Tadahiro Sekimoto, Washington, D.C., assignor to Nippon Electric Company, Limited, Tokyo, Japan, a corporation of Japan Filed Oct. 29, 1965, Ser. No. 505,661
Claims priority, application Japan, Dec. 28, 1964, 39/74,361
U.S. Cl. 325—38 4 Claims
Int. Cl. H04b 7/00, 1/04; H04l 5/00

ABSTRACT OF THE DISCLOSURE

The improvement in a pulse communication system where a plurality of stations communicate with one another. Each station includes apparatus for converting each pulse in an information pulse train into a binary coded signal representing the called station. A carrier selector determines the allotted frequency to be used in communicating and it is this frequency which is modulated with a transformed code train.

Figure 1A:
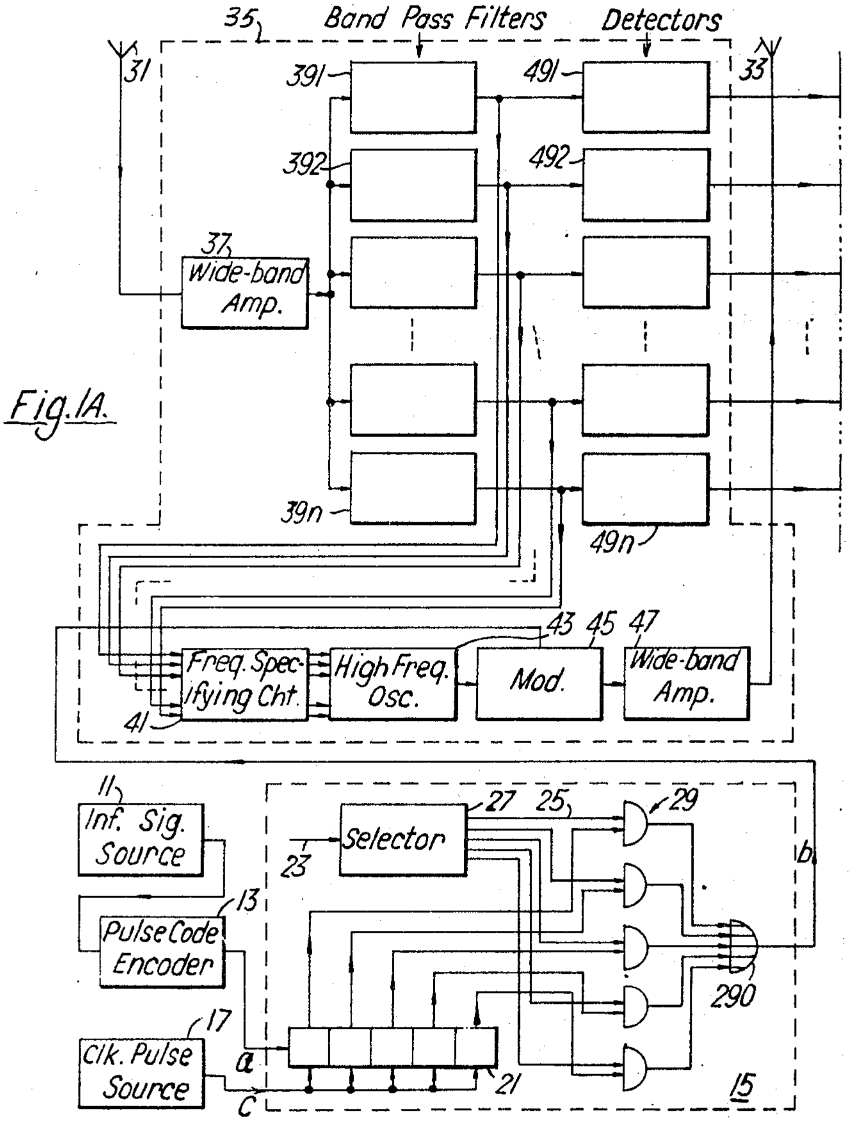

This invention relates to a pulse communication system capable of sending information from a given station to another preselected station and, more particularly, to a wireless communication system of this type. This invention is particularly applicable to mobile communication systems which have more-than-two transceivers, such as taxi wireless stations and train wireless stations.

Among the proposals for voluntarily interchanging communication between two of a multiplicity of scattered wireless stations is a communication system which includes a fixed exchange station and a plurality of individual, for example, mobile stations, each of which is assigned a specific VHF radio frequency. In this system the calling party transmits to the exchange station in the frequency band allotted thereto, the identifying code of the selected called party. The exchange station in turn transmits, in compliance with the identifying code supplied thereto, another signal of the frequency allotted to the called party, to complete the channel. This system requires a separate radio frequency for each of the individual stations. Consequently, the radio-frequency band is not only poorly utilized, but also the number of the individual stations is limited with this system. Another proposal for interchanging communication between two of a scattered multiplicity of wireless stations is revealed in an article by P. J. Klass in Aviation Week and Space Technology, dated May 13, 1963, titled "System Offers Private-Line Radio Service." In this proposal each station is assigned a specific combination of $n$ radio frequencies among $m$ VHF frequencies ($m$ is greater than $n$) radio frequencies $f_1$, $f_2$ . . . , and $f_m$. In general, the reliability required for an exchange station is much higher than that required for each of the individual stations. It is therefore possible with the Klass system which does not require an exchange station to raise (in this respect) the reliability of the entire system. Furthermore, it is possible with the Klass system wherein $m$ radio frequencies can be assigned to ${}_mC_n$ individual stations, to utilize the radio-frequency band with excellent efficiency and to substantially remove the restriction imposed on the number of the individual stations. One failing of this system should be noted, however, that is when channels for a plurality of pairs of individual stations are simultaneously on service in the Klass system, a radio frequency $f_k$ may be contained in common in some of the frequency combinations assigned to the called parties of the pairs and result in crosstalk. It should furthermore be noted that in this proposed system, certain $n$ radio frequencies (among the frequencies used in the frequency combinations allotted to the called parties of the pairs) might coincide with a frequency combination allotted to an individual station that belongs to none of the pairs and thus result in misoperation of the communicative system.

An object of the present invention is therefore to provide a highly reliable pulse communication system wherein any one of a plurality of stations can send information to any other preselected station.

Another object of the invention is to provide a highly reliable pulse communication system in which the carrier-frequency band is utilized at high efficiency.

Still another object of the invention is to provide a pulse communication system wherein neither crosstalk number of stations while utilizing a limited number of carrier frequencies.

Yet another object of the invention is to provide a pulse communication system wherein neither crosstalk nor misoperation will occur even when a plurality of channels are in service simultaneously.

According to an aspect of the instant invention, a pulse communication system is provided in which any calling station of a multiplicity of scattered stations is capable of sending information to any preselected called station. In this system a plurality of carrier frequencies are used and each individual station is assigned a particular combination of carrier frequencies thereby to provide selection codes. Each station identifying code combination has a particular arrangement of a predetermined number of pulses of various states, on and off, or long and short. In the calling station, the aural signal or other electric information signal to be transmitted to the called station can be pulse-code-modulated (PCM) (or other pulse modulation) into a train of information pulse permutations, each having at least one-bit pulse position and each being dependent on the information signal being transmitted.

Each bit of the pulse permutations is then again pulse-modulated in compliance with the selection code assigned to the called station so that the information pulse train can be converted into a selection-code pulse train which depends on the information signal being transmitted to the called station and on the selection code or the particular pulse permutation allotted to the called station (and which is composed of such selection codes). Furthermore, the calling station selects a free carrier frequency, which is not being used in any one of the channels being formed between station pairs, by means of a receiver capable of receiving signal waves, namely the modulated or unmodulated carrier waves, of all the carrier frequencies allotted to the communication system. The calling station then generates a carrier wave of the selected frequency and, after modulating this selected frequency transmits the information. The called station has essentially the same construction as the calling station and includes filters for separating the signal waves of all the carrier frequencies assigned to the communication system from each other and not only produces the selected carrier wave of the kind according to which of the filters has no output, but also compares the pulse trains appearing on the output sides of some of the filters with the particular selection code allotted to the station to select, if any, the information pulse train carried by the carrier wave modulated by a pulse train composed of the particular selection codes. The called station decodes the information pulse train in the known manner to regenerate the information signal sent from the calling station.

With this invention, no exchange is needed, and it is therefore possible to raise the reliability of the communication system. The number of the allotted carrier frequencies is determined in accordance with the number of station pairs which are likely to exchange information simultaneously and consequently is far less than the number of all the individual stations contained in the system (as is the case with the capacity of a switchboard in an ordinary telephone system). As a result, it is possible with the present invention to raise the efficiency of the carrier-frequency band. Furthermore, the number of pulse positions in a selection code to be allotted to each of the individual stations may be made relatively large and independent of the number of the carrier frequencies assigned to the communication system, and it is accordingly possible with the instant invention to augment the number of individual stations of the system without reducing the efficiency of the carrier-frequency band. In addition, there is no fear of crosstalk and misoperation in the system of this invention, because each of the individual stations is assigned a specific selection code combination composed of particular pulse permutations.

Figures 1B, 1C:
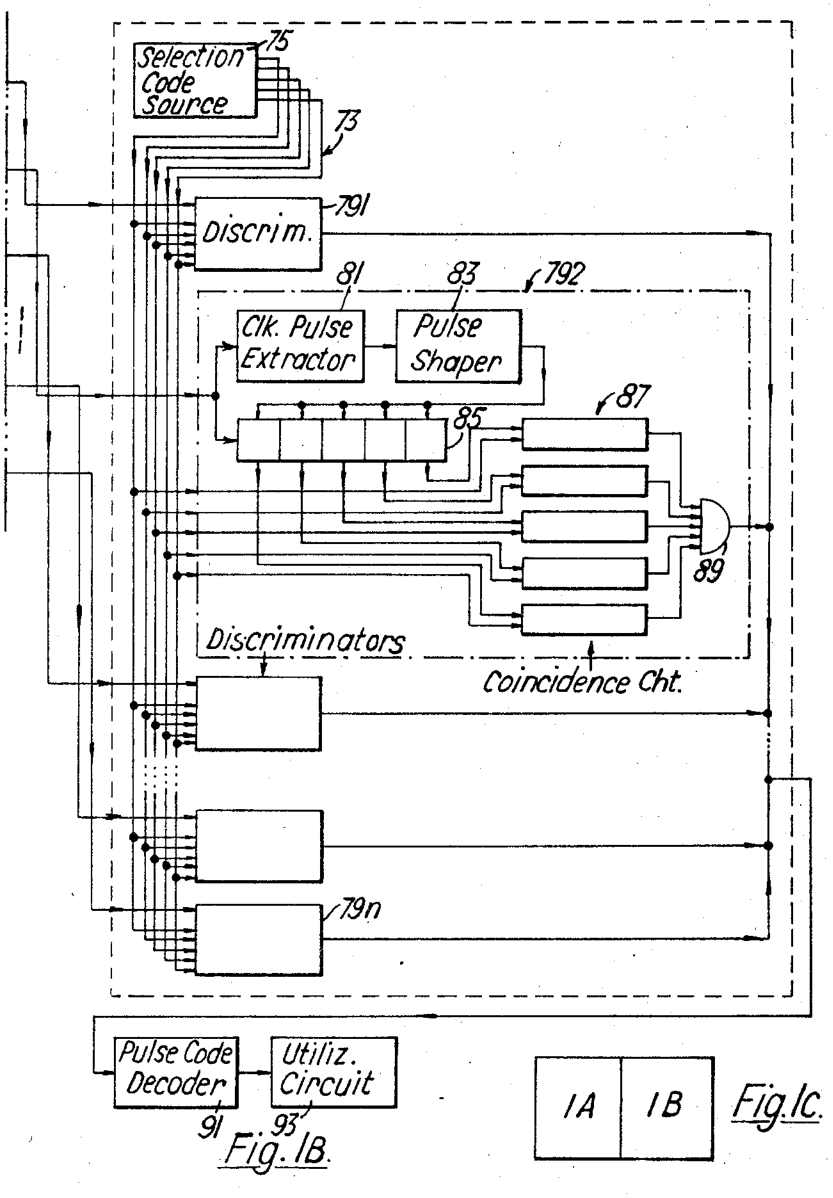
Figure 3:
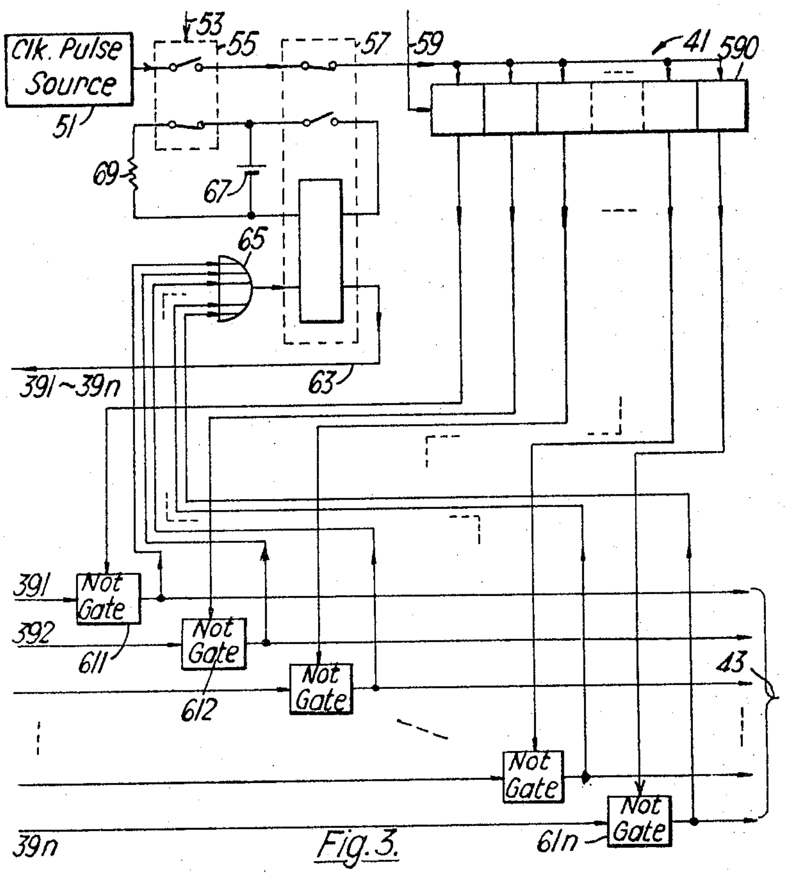
Figure 2:
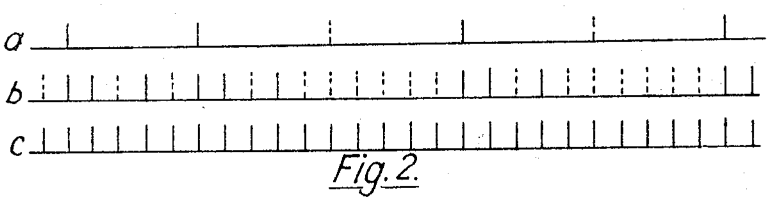

The above-mentioned and other features and objects of this invention and the means for attaining them will become more apparent and the invention itself will be best understood by reference to the following description of embodiments of the invention taken in conjunction with the accompanying drawings in which:

FIGS. 1A and 1B when put in side by side relation as indicated in FIG. 1C illustrate, partly in block form, the circuit of a preferred embodiment of the present invention;

FIG. 2 shows waveforms of the signals at various points of the embodiment of FIG. 1; and FIG. 3 is a circuit diagram of an example of the frequency-specifying circuit, partly shown in blocks, of the embodiment of FIG. 1.

In the subsequent description, the information signal to be transmitted from a calling station to a called station will be assumed to have been pulse-modulated using modulation techniques. It will, however, be understood by those skilled in the art that other pulse modulation techniques could be used without losing the generality in the following description.

Referring to FIGS. 1A–1C and 2, an individual station of a VHF wireless pulse communication system of this invention is illustrated. The station includes an information signal source 11 which supplies an information signal to be transmitted to another desired station in the system. The signal source 11 may for example include a microphone for converting speech to an electric signal. The individual station further includes a pulse-code encoder 13 which encodes using known delta modulation techniques, the information signal into an information-pulse train *a* which has "on" and "off" pulses arranged in accordance with the information signal and which thus serves as an information-pulse source. In FIG. 2, "on" and "off" pulses are shown by solid and broken lines, respectively. In the foregoing description, the pulse trains are assumed to have no actual pulses at the pulse positions of the "off" pulses, although negative-going pulses could be provided at these "off" positions. The individual station further includes a selection-code encoder 15 for further encoding the information-pulse train *a*, by converting each pulse thereof to a selection code (or a particular pulse permutation allotted to the desired called station) or into the selection-code pulse train *b*. In the example being explained, each information-pulse permutation wherein the pulse arrangement is determined by the information signal, is composed of only one pulse, and the selection code wherein the pulse permutation is predetermined for each of the individual stations, is formed of five-digit pulses. Moreover, the selection code assigned to the desired station being called in this case is assumed to be "on," "on," "off," "on," and "off," or 11010. If a five digit selection code is used, it will be necessary upon activation of the selection-code encoder 15 to use a clock-pulse train *c* which has a frequency five times that of the sampling frequency used for the delta modulation (as will be easily understood by those skilled in the art). The clock-pulse train *c* in FIG. 2 may be generated by a clock-pulse source 17 of FIG. 1. These clock pulses may also be supplied to the pulse-code encoder 13 to control the behavior thereof, or alternatively, may be derived from a sampling-pulse train produced by a sampling-pulse source accompany the pulse-code encoder 13. Incidentally, the pulse-code encoder 13 serves as the information-pulse source when a digital signal is to be sent as the information signal from the calling station to the called station.

Continuing to refer to FIGS. 1 and 2 and referring to FIG. 1A in more detail, the selection-code encoder 15 includes: a five-stage shift register 21, controlled by the clock-pulse train *c*, for transferring pulses of the information-pulse train *a* stepwise from the first stage to the fifth stage; a participant selector 27 for generating on five-pair control lines 25 D.C. currents which have the pattern for the selection code 11010 of the desired called station which is set by manually switching (as shown by an arrow 23), a rotary switch to the position of the called station or in any other way. Five AND gates 29 are provided. The respective first inputs to these AND gates are the D.C. currents present on the control lines 25. The respective second inputs to AND gates 29 is the information stored in the corresponding stages of the shift register 21. An OR gate 290 is connected to receive all the outputs of the AND gate 29. It will be clear from this construction, that the selection-code encoder 15 can convert the information-pulse train *a* into the selection-code pulse train *b* in FIG. 2. It will also be evident that the selection-code encoder 15 may be formed in various ways by means of various logical circuits.

Referring further to FIG. 1A, the individual station further includes a transmitter-receiver 35 (transceiver) which is responsive to the selection-code pulse train *b* appearing on the output side of the selection-code encoder 15 and the received signals (modulated and/or unmodulated signals) from reception antenna 31. Transceiver 35 determines (with regard to call VHF radio frequencies used in this communication system and in a predetermined sequence for this individual station) which carrier signal waves are being used by other stations and are reaching the antenna 31. Moreover transceiver 35 generates an electric oscillation of that carrier radio frequency which has first been judged to be free (i.e., out of use). Transceiver 35 then transmits signals to a transmission antenna 33 (after modulating by the selection-code pulse train *b*). Transceiver 35 further radio-frequency-detects all the signal waves received by the reception antenna 31. Continuing to refer to FIG. 1A, the transmitter-receiver 35 more specifically includes a wide-band reception amplifier 37 for amplifying the signals received by reception antenna 31. Band-pass filters 391, 392 . . . and 39*n* are provided to filter signal in their respective pass bands to pass therethrough signals which are around the respective radio frequencies $f_1$, $f_2$ . . . and $f_n$ allotted to the communication system. Filters 391; 39*n* thus separate the components contained in the output of the wide-band reception amplifier 37 from each other by the characteristic radio frequencies $f_1$, $f_2$ . . . and $f_n$. A frequency-specifying circuit 41 is provided for judging (in the order or sequence predetermined for the individual station) whether or not there are outputs on the respective output sides of the band-pass filters 391, 392 . . . and 39*n* and for producing a frequency-specifying output designating which radio frequency ($f_1$, $f_2$ . . . or $f_n$) is the first filter output that has been judged to have no output. A high-frequency oscillator 43, responsive to the frequency-specifying output is also provided for generating electric oscillation of the designated frequency. A modulator 45 is also provided for modulating the free frequency which is generated by the high-frequency oscillator 43 with the selection-code pulse train *b*. A wide-band transmission amplifier 47 amplifies the modulated electric oscillation from modulator 45 and supplies the thus amplified oscillation to the transmission antenna 33. High frequency detectors 491, 492 . . . and **49*n* are provided for detecting the outputs of the band-pass filters 391, 392 . . . and 39*n***, respectively.

Referring to FIG. 3, there is illustrated therein, in more detail, the frequency-specifying circuit 41 contained in the transmitter receiver 35 of FIG. 1A. Circuit 41 includes a clock-pulse source 51. A manually-operable switch 55 is provided which has a make contact connected to the clock-pulse source 51 and a break contact and which can be switched manually as shown by an arrow 53. A relay 57 is also provided which has a break contact connected in series with the make contact of the manual switch 55 and a make contact. The *n*-stage register 590 shifts from stage to stage, each time a clock pulse is supplied through the break contact of the relay 57, the "on" stage stored preliminarily manually in the first stage is illustrated by an arrow 59. NOT gate circuits 511, 612 . . . and **61*n*, responsive to the instantaneous contents stored in the respective stages of the shift register 590 (which are supplied thereto as the inhibit inputs) are provided for sending a selected output of the respective band-pass filters 391, 392 . . . and 39*n* to the high-frequency oscillator 43 as the frequency-specifying output. The OR-gate 65 is supplied with the outputs of the NOT circuits, and energizes the relay 57 through a return path 63 leading to the band-pass filters 391, 392 . . . and 39*n*. The relay 57 has a self-holding winding connected through the make contact thereof to a D.C. power source 67 which in turn has a series circuit composed of the break contact of the manual switch 55 and a protection resistor 69**.

The transmitter-receiver 35 is activated when the operator switches the manual switch 55. This allows the clock pulses from the clock-pulse source 51 to turn, through the break contact of the relay 57 which is not yet energized, the outputs of every stage of the shift register 590 successively into the "on" state. The frequency-specifying circuit therefore discriminates, in the order of the radio frequencies $f_1$, $f_2$ . . . and $f_n$ assigned to this communication system, if each of these radio frequencies is already being used by a pair of stations of the system and produces the frequency-specifying output, on the output side of that NOT circuit **61*k* which corresponds to the first free frequency $f_k$ sensed to make the high-frequency oscillator 43 generate the electric oscillation of the specified radio frequency $f_k$. At the same time, the frequency-specifying output energizes, through the OR gate 65, the relay 57 to open its break contact to stop the stepping of the shift register 590 and to close its make contact to hold the relay 57 in the energized state. This prevents the shift register 590 from stepping any further even if the electric oscillation of the specified radio frequency $f_k$ generated by the radio frequency oscillator 43 is received by the reception antenna 31 of said station to turn the output of the corresponding band-pass filter 39*k* to the "on" state. To end the communication, the operator puts back the manual switch 55. This breaks the self-holding circuit for the relay 57 through the circuit composed of the break contact of the manual switch 55 and the protection resistor 69 to release the relay break and make contacts. As will be understood from the above, the clock-pulse source 51 may conveniently be the same one used with the clock-pulse source 17 accompanying the selection-code encoder 15 of said station or it may be a separate clock source. Also, the shift register 590** may have any stage thereof other than the first stage put into the "on" state preliminarily.

It will now be clear that the transmitter-receiver 35 operates as indicated heretofore. Incidentally, the high-frequency oscillator 43 has been presumed to be one that can produce (until the operator stops the operation of the transmitter-receiver 35) the radio-frequency electric oscillation designated by the frequency-specifying output.

Returning to FIG. 1B, the station further includes a discriminator 71 for transforming (when some selection codes for said station, namely some pulse permutations allotted to said station, are contained in any of high-frequency-detected outputs of the transmitter-receiver 35) each of the selection codes into a single pulse. More particularly referring to FIG. 1B the discriminator 71 includes a selection-code source 75 for producing on its five pairs of control lines 73 D.C. currents in the selection code pattern allotted to said station. A plurality of unit discriminators 791, 792 . . . and **79*n* are supplied with the received electron-code pulse trains from the respective high-frequency detectors 491, 492 . . . and 49*n* of the transmitter-receiver 35. For example, the unit discriminator 792 comprises: a clock-frequency extractor 81 having a high-frequency filter for extracting a clock-frequency signal from the received selection-code pulse train supplied thereto. A pulse shaper 83 is provided for shaping the output of the clock-frequency extractor 81** to derive a clock-pulse train, such as shown in FIG. 2*c* (which is shaped in synchronism with the selection-code pulse train). A five-stage shift register 83 is controlled by the clock-pulse train and shifts the received selection-code pulse train supplied and stored therein step-by-step therethrough. Five coincidence circuits 87 are provided and connected so that each is supplied wtih a first input which is the output of a corresponding stage of the shift register 85 and with a second input which is the D.C. current present on a corresponding one of the control lines 73. The AND gate 89 is supplied with all the outputs of the coincidence circuits 87.

When the first pulse of a selection code reaches the last stage of the shift register 85 of the unit discriminator 792, the contents of the shift register 85 are the pulses of a selection code in the order or sequence from the last stage to the first stage. The AND gate 89 therefore, produces an output pulse for each selection code only when the selection-code pulse train supplied to the unit discriminator 792 is composed of the selection codes allotted to said station.

Referring further to FIG. 1B the station also includes: a pulse-code decoder 91 for decoding the information-pulse train derived (as indicated above) from only one of the unit discriminators 791, 792 . . . and **79*n*; and a utilization circuit 93** for utilizing the electrical information obtained through the pulse-code decoding.

In the discriminator 71 shown in FIG. 1B it is possible to use, in place of the *n* unit discriminators 791, 792 . . . and **79*n***, either a single time-division discriminator which is supplied, in the time-division fashion, with all the outputs of the *n* high-frequency detectors 491, 492 . . . and **49*n* of the transmitter-receiver 35** or a small number of similar time-division unit discriminators for the outputs of the *n* high-frequency detectors 491, 492 . . . and **49*n* which were divided into groups of such a number. Futhermore, it is possible for the called station to simultaneously receive the signals from two or more stations, if two or more pulse-code decoders and utilization circuits, such as 91 and 93**, are provided and are coupled with a time-division discriminator, time-division unit discriminators, or unit discriminators. Also, it is possible for the called station to receive only the signal from that one of the calling stations that have begun the transmission. In this case *n* unit discriminators 791, 792 . . . and **79*n* are used and once one of the unit discriminators 791, 792 . . . and 79*n*** has produced an output, this output can be used to stop the operation of the remaining unit discriminators. However, if either a time-division discriminator or time-division unit discriminators are used, then the output, once produced, will stop the time-division scanning operation.

In order to allow a calling station which has sent signals to a called station to receive an answer back from the called station, it is necessary for the calling station to send, during the call, the selection code thereof to the called station. Then, it will be possible in the called station to send out the answer back by setting the selection code at its participant selector and by switching the manual switch of the frequency-specifying circuit of its transmitter-receiver. Incidentally, it may be convenient to make a calling station send out its own selection codes at the beginning of the message to be transmitted and to make the participant selector and the manual switch of the called station automatically set such selection codes therein and put the transmitter-receiver into operation, respectively. If it is desired for a particular station of the communicating system to send out, as a master station, a general calling to all the other stations, it is only necessary to provide a particular high frequency for such general calling.

To cite some examples, the number of individual stations in a communication system of the invention and the number of carrier frequencies therefor are 120 and 20, respectively, when the call loss and the number of calls are 1% and 3.6 HSC (0.1 Erlangen), respectively. In this case, a selection code may be composed of twelve bits. If the sampling frequency for the delta modulation is 40 kc., the clock frequency may be 480 kc. and consequently it is possible to select twenty radio frequencies ranging to 500 kc. in the VHF band.

In the above explanation, no details were provided with respect to synchronization which has little connection with the spirit of this invention. It is, however, imperative on the receiver side of the communication system of this invention to maintain the letter synchronism, namely, to make it possible to discriminate which pulse positions are occupied by a single selection code in the received selection-code pulse train. In this connection, it should be noted that if 11010, 10101, or the like is selected for a selection code, the unit discriminator 792 of the discriminator 71 of the above-described embodiment produces by itself only one pulse for each selection code but that if 101010, 100100, or a similar six-bit selection code is selected, the unit discriminator 792 will produce three or two output pulses for each selection code when some selection codes appear contiguously in the selection-code pulse train. Such misoperation may be avoided by selecting the selection codes in consideration of the letter synchronism or by employing a letter synchronization signal which corresponds to the known frame-synchronization signal.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A pulse communication system having a plurality of stations each being responsive to a different set of coded signals transmitted thereto in one of a group of allotted carrier frequencies, each station comprising:

(A) means for converting information signals into a pulse modulated train of information pulses;

(B) means for transforming each information pulse in said train into said set of coded signals for the selected station to which said information signals are to be transmitted;

(C) transmitter-receiver means which includes:

(1) carrier selector means for determining which of said allotted carrier frequencies are not then being used in the system and for selecting one of said unused carrier signals;

(2) modulation means for modulating the thus selected carrier signal with the train of coded signal sets produced by said transforming means;

(3) transmitting means for transmitting the thus transformed signals; and (D) extraction means for extracting information only from the signals received by said stations that contain the preset combination of signals identifying said station.

2. The pulse communication system claimed in claim 1, wherein said pulse modulated train of information pulses is pulse code modulated, and wherein each pulse in said train is replaced by a plural digit binary code representing said set of coded signals.

3. A pulse communication system as set forth in claim 1 wherein each station is identified by a preset different combination of binary signals, said transforming means transforming each pulse of said information pulse train into the preset combination for the preselected station, the presence of said preset combination in the transmitted signal during a given interval indicating the presence of a pulse in the information pulse train during said interval.

4. A pulse communication system as set forth in claim 1 wherein said extraction means includes: a plurality of filters each of which is adapted to pass a different one of said allotted carriers; a detector connected to the output of each filter for detecting the presence of a carrier signal being passed by the filter connected thereto; discriminator means connected to said detectors for passing therethrough only those received carrier signals containing the preset combination identifying said station and regenerator means connected to said discriminator means for regenerating the original information signals from the discriminator output signals.

References Cited

UNITED STATES PATENTS

| | | | |
|---|---|---|---|
| 2,479,701 | 8/1949 | Ress | 343—177 |
| 3,239,761 | 3/1966 | Goode | 325—55 X |
| 3,292,178 | 12/1966 | Magnuski | 325—55 X |

ROBERT L. GRIFFIN, *Primary Examiner.*

B. V. SAFOUREK, *Assistant Examiner.*

U.S. Cl. X.R.

179—15; 325—51, 55, 141, 175, 177